US012206124B2

(12) United States Patent
Choi et al.

(10) Patent No.: US 12,206,124 B2
(45) Date of Patent: Jan. 21, 2025

(54) BATTERY MODULE

(71) Applicant: SK Innovation Co., Ltd., Seoul (KR)

(72) Inventors: Yang Kyu Choi, Daejeon (KR); Hae Ryong Jeon, Daejeon (KR); Ha Chul Jeong, Daejeon (KR); Seo Roh Rhee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 34 days.

(21) Appl. No.: 17/538,423

(22) Filed: Nov. 30, 2021

(65) Prior Publication Data

US 2022/0173475 A1 Jun. 2, 2022

(30) Foreign Application Priority Data

Nov. 30, 2020 (KR) .................. 10-2020-0164096

(51) Int. Cl.
| | |
|---|---|
| *H01M 50/264* | (2021.01) |
| *H01M 10/658* | (2014.01) |
| *H01M 50/204* | (2021.01) |
| *H01M 50/24* | (2021.01) |
| *H01M 50/276* | (2021.01) |
| *H01M 50/293* | (2021.01) |
| *H01M 50/502* | (2021.01) |

(52) U.S. Cl.
CPC ....... *H01M 50/264* (2021.01); *H01M 10/658* (2015.04); *H01M 50/204* (2021.01); *H01M 50/24* (2021.01); *H01M 50/276* (2021.01); *H01M 50/293* (2021.01); *H01M 50/502* (2021.01)

(58) Field of Classification Search
CPC .. H01M 50/264; H01M 10/658; H01M 50/24; H01M 50/502; H01M 50/276; H01M 50/293; H01M 50/204
See application file for complete search history.

(56) References Cited

U.S. PATENT DOCUMENTS

| | | | | |
|---|---|---|---|---|
| 2015/0295214 | A1* | 10/2015 | Cho ................... | H01M 50/249 |
| | | | | 429/151 |
| 2016/0036024 | A1* | 2/2016 | Choi .................. | H01M 50/105 |
| | | | | 429/54 |
| 2017/0141365 | A1* | 5/2017 | Kim .................... | H01M 50/509 |
| 2018/0375078 | A1* | 12/2018 | Lee ......................... | B60L 50/66 |
| 2019/0115638 | A1* | 4/2019 | Chen .................. | H01M 50/103 |
| 2019/0189982 | A1* | 6/2019 | Lee .................. | H01M 10/0472 |
| 2019/0267591 | A1* | 8/2019 | Park ................... | H01M 50/211 |
| 2020/0099114 | A1 | 3/2020 | Ryu et al. | |
| 2021/0328251 | A1* | 10/2021 | Zhao .................. | H01M 10/613 |
| 2021/0359372 | A1* | 11/2021 | Wu ..................... | H01M 50/148 |

(Continued)

FOREIGN PATENT DOCUMENTS

| | | |
|---|---|---|
| KR | 10-2016-0014828 A | 2/2016 |
| KR | 10-2018-0092406 A | 8/2018 |
| KR | 10-2019-0094921 A | 8/2019 |

*Primary Examiner* — Matthew T Martin
*Assistant Examiner* — Taylor Harrison Krone
(74) *Attorney, Agent, or Firm* — IP & T GROUP LLP

(57) ABSTRACT

A battery module includes a plurality of battery sub-packing units including at least one battery cell and a case in which the at least one battery cell is accommodated, and a body frame unit surrounding upper portions and outermost side portions of the plurality of battery sub-packing units, where lower portions of the plurality of battery sub-packing units are directly exposed to the outside.

15 Claims, 13 Drawing Sheets

(56) References Cited

U.S. PATENT DOCUMENTS

| | | | |
|---|---|---|---|
| 2022/0077535 A1* | 3/2022 | Hidaka | H01M 50/291 |
| 2022/0102763 A1* | 3/2022 | Whitman | H01M 50/569 |
| 2022/0123400 A1* | 4/2022 | Kim | H01M 10/482 |
| 2022/0263174 A1* | 8/2022 | Yu | H01M 50/211 |
| 2022/0271387 A1* | 8/2022 | Shin | H01M 50/211 |
| 2023/0046419 A1* | 2/2023 | Chun | H01M 50/271 |
| 2023/0067646 A1* | 3/2023 | Heki | H01M 50/507 |

* cited by examiner

BATTERY MODULE

CROSS-REFERENCE TO RELATED APPLICATION(S)

This application claims benefit of priority to Korean Patent Application No. 10-2020-0164096 filed on Nov. 30, 2020 in the Korean Intellectual Property Office, the disclosure of which is incorporated herein by reference in its entirety.

BACKGROUND

1. Field

Embodiments of the present disclosure relate to a battery module.

2. Description of Related Art

As technological development of and demand for mobile devices, electric vehicles, and energy storage systems (ESS) have increased, demand for secondary battery cells as an energy source has also been rapidly increased. A secondary battery cell may be repeatedly charged and discharged as mutual conversion between chemical energy and electrical energy is reversible.

The secondary battery cell may include an electrode assembly including a positive electrode, a negative electrode, a separator, and an electrolyte, which may be main components of a secondary battery, and a cell body member of a multilayer laminated film case for protecting the above components.

However, such an electrode assembly may generate heat while being charged and discharged, and the temperature rise caused by the heat may deteriorate performance of the secondary battery cell.

Also, when the heat increases, the internal pressure of the secondary battery cell may rise, leading to ignition of the secondary battery cell.

Further, when a plurality of secondary battery cells are mounted as in an electric vehicle or an energy storage system (ESS), the secondary battery cell may explode due to the ignition and flames may spread to the other secondary battery cells.

In other words, gas and flames generated in the secondary battery cell may not be discharged from the battery cell and may spread to the other secondary battery cells such that the secondary battery cells may explode consecutively.

Therefore, to address the above-mentioned issues and limitations, studies into a battery module has been necessary.

SUMMARY

An embodiment of the present disclosure is to provide a battery module which may prevent ignition of a battery cell from spreading.

An embodiment of the present disclosure is to provide a battery module which may guide flames to the outside or may extinguish the flames when the battery cell ignites.

According to an embodiment of the present disclosure, a battery module includes a plurality of battery sub-packing units including at least one battery cell and a case in which the at least one battery cell is accommodated, and a body frame unit surrounding upper portions and outermost side portions of the plurality of battery sub-packing units, where lower portions of the plurality of battery sub-packing units are directly exposed to the outside.

The body frame unit may include an upper frame covering the upper portions of the plurality of battery sub-packing units, and side frames extending from both ends of the upper frame, respectively, and bent to oppose each other so as to surround the outermost side portions of the plurality of battery sub-packing units.

The side frame may include a supporting member formed by bending at least a portion of a lower end of the side frame, and the supporting member may support a portion of the lower portion of the battery sub-packing unit disposed on an outermost portion among the plurality of the battery sub-packing units.

The body frame unit may include a busbar to which an electrode tab of the battery cell accommodated in each of the plurality of battery sub-packing units is coupled.

The body frame unit may include a barrier disposed between the battery sub-packing units adjacent to each other or between an upper portion of the battery sub-packing unit and the body frame unit, preventing flame transfer or heat transfer, and having an external surface applied with an adhesive.

The case may include front and rear end panels disposed on front and rear portions of the at least one battery cell, and configured to include a sub-vent hole formed in a lower end portion thereof for communicating with an exterior of the case and an interior of the case, and a surrounding cover configured to surround at least a portion of an outer surface of the at least one battery cell along an edge of the front and rear end panels.

At least one of the front and rear end panels may include a sub-guide pipe disposed on a periphery of the sub-vent hole, connected to the sub-vent hole, and extending in an outward direction.

The surrounding cover may be formed of the same metal material as that of the body frame unit.

The surrounding cover may be formed of stainless steel or a metal having a melting point of 1000° C. or higher.

The surrounding cover may include an accommodation can having front and rear end portions to which the front and rear end panels are respectively coupled, and surrounding a lower surface portion and a side surface portion of the at least one battery cell directed in an outward direction, and a pair of upper fastening portions extending from side wall portions of the accommodation can opposing each other, bent in a direction of the upper surface portion of the battery cell, and fastened to each other to surround the upper surface portion of the battery cell.

The pair of the upper fastening portions may include a first fastening portion extending from the side wall portion of one side of the accommodation can, having a hooking groove formed therein, and having a hook protruding inwardly of the hooking groove, and a second fastening portion extending from the side wall portion of the other side of the accommodation can and having an accommodation groove into which the hook is inserted.

The battery sub-packing unit may include an inner pad disposed in the case, the inner pad being in contact with at least a portion of the at least one battery cell accommodated in the case and blocking an inflow of external oxygen by generating at least one of carbon dioxide and nitrogen during oxidation.

The inner pad may include a melamine material.

The body frame unit may include front and rear end frames covering front and rear surfaces of the plurality of battery sub-packing units, respectively, and at least one of the front and rear end frames may include a body vent hole connected to the sub-vent hole on a lower end.

The front and rear end frames may include a metal foam block inserted into the body vent hole to block the body vent hole and formed of a material melting by flames generated in the battery sub-packing unit.

According to an embodiment of the present disclosure, a battery module includes: a plurality of battery sub-packing units each including at least two battery cells accommodated within a case and separated from each other with an inner pad; and a body frame unit covering all sides of the plurality of the battery sub-packing units except of their bottom sides.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
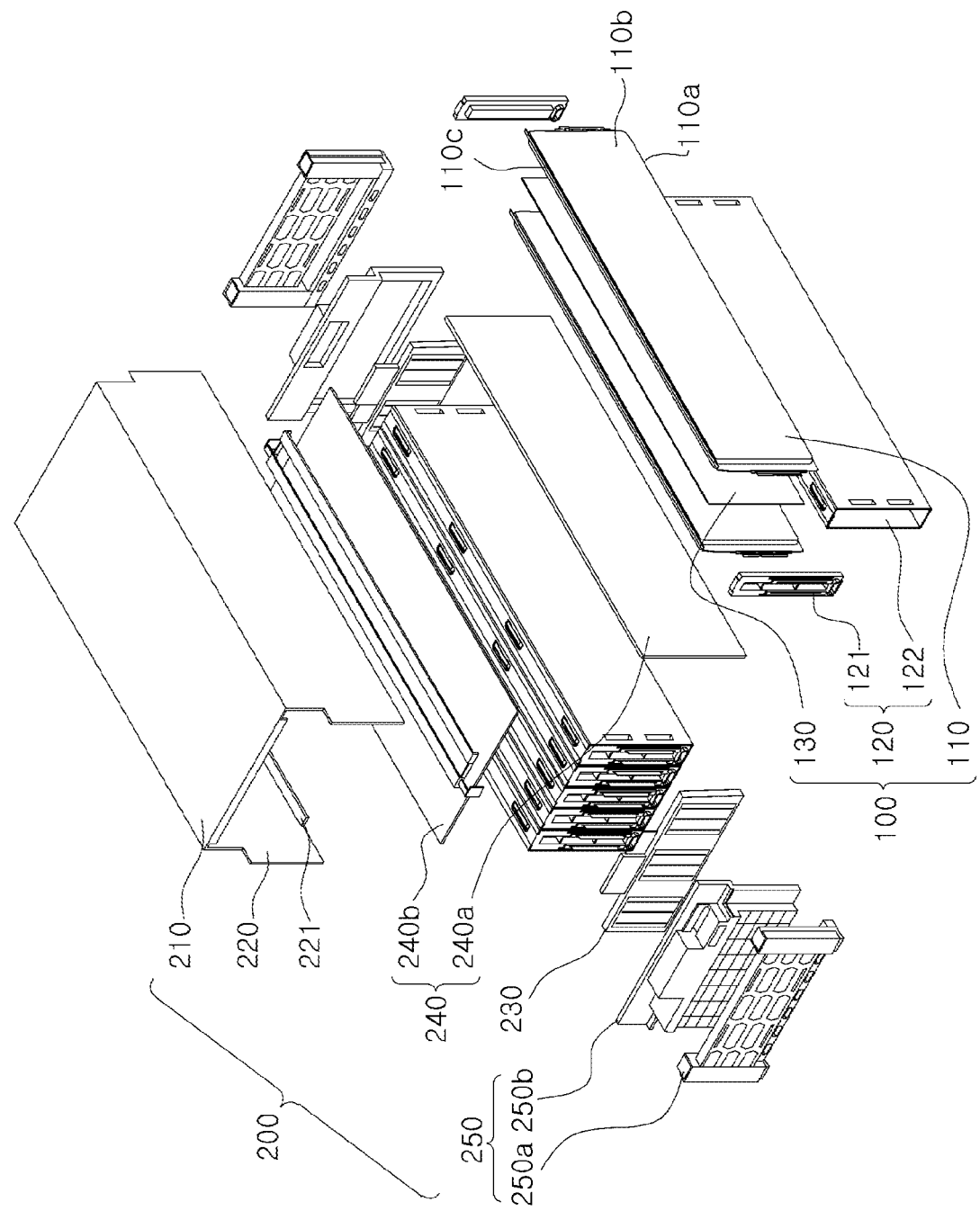
FIG. 1 is an exploded perspective diagram illustrating a battery module according to an embodiment of the present disclosure.

It is to be understood that the terms or words used in this description and the following claims must not be construed to have meanings which are general or may be found in a dictionary. Therefore, considering the notion that an inventor may most properly define the concepts of the terms or words to best explain his or her invention, the terms or words must be understood as having meanings or concepts that conform to the technical spirit of the present disclosure. Also, since the embodiments set forth herein and the configurations illustrated in the drawings are nothing but a mere example and are not representative of all technical spirits of the present disclosure, it is to be understood that various equivalents and modifications may replace the embodiments and configurations at the time of the present application.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

Figure 2:
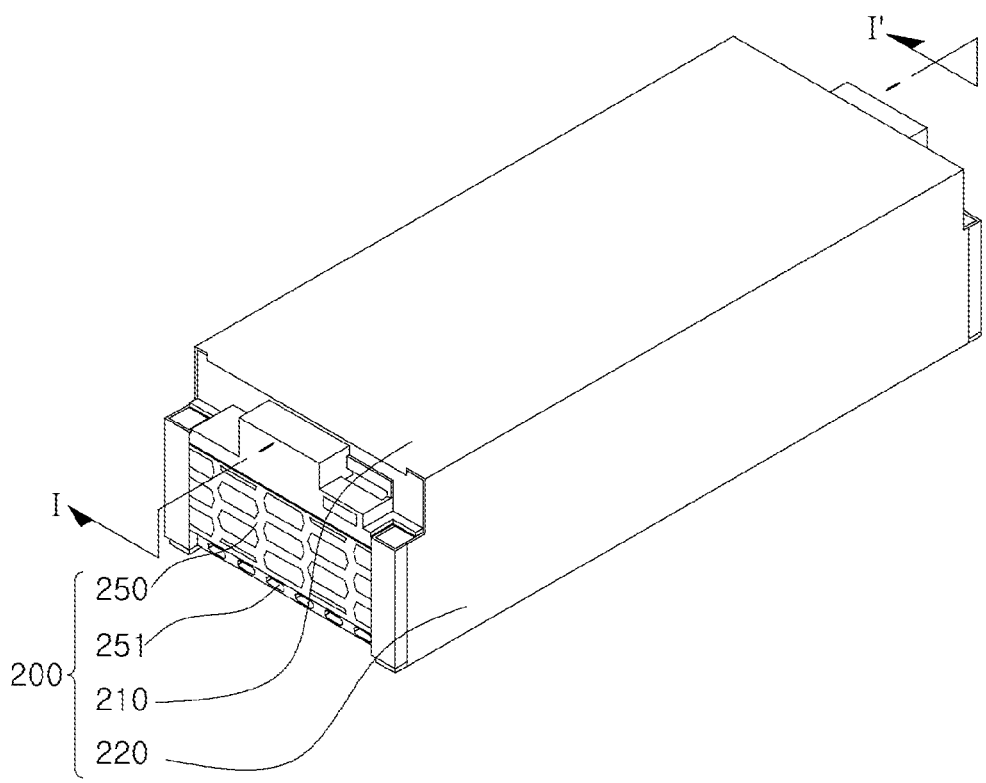
FIG. 2 is a perspective diagram illustrating a battery module according to an embodiment of the present disclosure.
Figure 3:
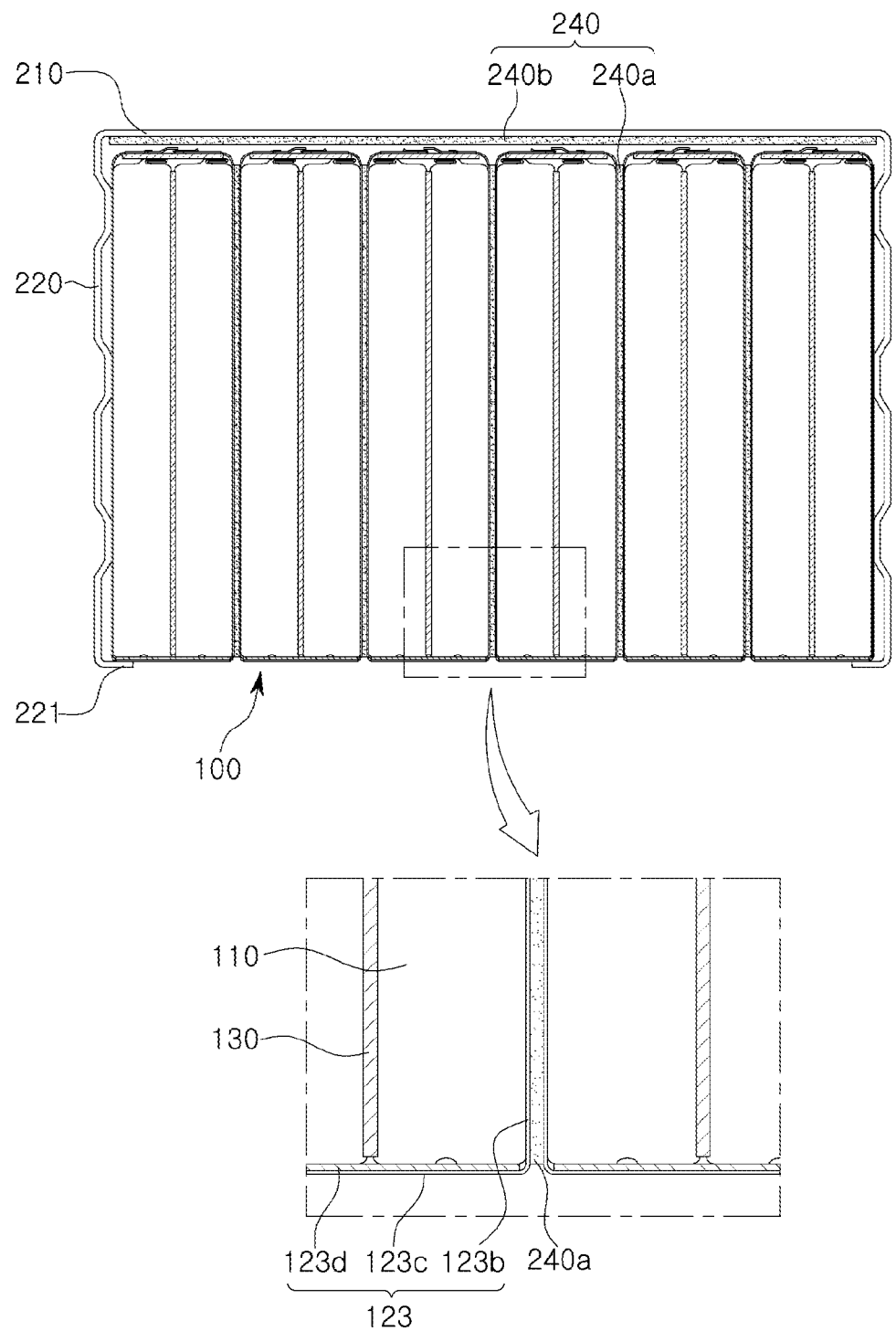
FIG. 3 is a cross-sectional diagram taken along a line perpendicular to the line I-I' of FIG. 2, illustrating a battery module according to an embodiment of the present disclosure.

FIG. 1 is an exploded perspective diagram illustrating a battery module according to an embodiment. FIG. 2 is a perspective diagram illustrating a battery module according to an embodiment. FIG. 3 is a cross-sectional diagram illustrating a battery module according to an embodiment.

Referring to the drawings, a battery module according to an embodiment may include a plurality of battery sub-packing units 100 and a body frame unit 200.

The battery sub-packing unit 100 may include at least one battery cell 110 and a case 120 in which the battery cell 110 is accommodated. The body frame unit 200 may be installed so as to surround an upper portion and a side of an outermost battery sub-packing unit of the plurality of battery sub-packing units 100. A lower portion of the plurality of battery sub-packing units 100 may be directly exposed to the outside.

The battery module may prevent ignition from spreading by packing the battery cell 110 using the battery sub-packing unit 100. Also, making the lower portion of the battery sub-packing unit 100 to be directly exposed to the outside may prevent lowering of the cooling efficiency of the battery cell 110.

Since the battery sub-packing unit 100 is configured to accommodate the battery cell 110 therein, even when the battery cell 110 is ignited, the spread of the flames may be prevented by the battery sub-packing unit 100. Accordingly, differently from a general battery module, the spread of flames may be prevented.

The battery sub-packing unit 100 may include one or two or more battery cells 110 and the case 120.

The battery cell 110 may include an electrode assembly and a cell body member surrounding the electrode assembly.

The electrode assembly may include an electrolyte and may be accommodated in the cell body member. The electrolyte may include a lithium salt such as $LiPF_6$, $LiBF_4$ or the like, in addition to an organic solvent such as ethylene carbonate (EC), propylene carbonate (PC), diethyl carbonate (DEC), ethyl methyl carbonate (EMC), or dimethyl carbonate (DMC). Also, the electrolyte may be in liquid, solid or gel form.

The cell body member may protect the electrode assembly and may accommodate the electrolyte. For example, the cell body member may be provided as a pouch-type member or a can-type member. The pouch-type member may accommodate the electrode assembly by sealing the electrode assembly on three or four side surfaces, and preferably only on three side surfaces. For example, an upper surface portion 110c and front and rear surfaces portions of the pouch-type member may be sealed while the electrode assembly is accommodated therein. The can-type member may accommodate the electrode assembly by sealing the electrode assembly on a single surface, and a single surface of the upper surface portion 110c may be sealed while the electrode assembly is accommodated therein.

However, the pouch-type battery cell 110 and the can-type battery cells 110 may only be examples of the battery cells 110 accommodated in the battery sub-packing unit 100, and the battery cell 110 accommodated in the battery sub-packing unit 100 is not limited to the above examples.

Also, the battery cell 110 may include the lower surface portion 110a, the upper surface portion 110c, and a side surface portion 110b, and may further include a front and rear portion from which the electrode tabs 111 connected to the electrode assembly are exposed to the outside.

The case 120 may be configured to surround the battery cell 110 to accommodate the battery cell 110. For example, a pair of battery cells 110 may be accommodated in the case 120. Accordingly, when flames are generated by explosion of the battery cell 110, the case 120 may prevent spread of the flames along with the body frame unit 200. To this end, the case 120 may include an end panel 121 and a surrounding cover 122. A detailed description thereof will be described with reference to FIGS. 10 to 13.

In the body frame unit 200, a plurality of the battery sub-packing units 100 may be accommodated. Also, the body frame unit 200 may accommodate the battery sub-packing unit 100 such that a lower portion of the battery sub-packing unit 100 may be directly exposed to the outside, and accordingly, the issue in which degradation of cooling performance caused by packing the battery cell 110 using the case 120 may be prevented.

That is, the body frame unit 200 may surround the upper portion of the plurality of battery sub-packing units 100 and the outer portion of the battery sub-packing unit 100 disposed on the outermost portion among the plurality of battery sub-packing units 100.

To this end, the body frame unit 200 of the battery module in an embodiment may include an upper frame 210 and a side frame 220.

Specifically, the upper frame 210 may be configured to cover the upper portion of the plurality of battery sub-packing unit 100. The side frame 220 may be configured to extend from both ends of the upper frame 210, respectively, and may be bent to oppose each other so as to surround a side portion of the outermost portion of the plurality of battery sub-packing units 100. The upper frame 210 and the side frame 220 may be integrated with each other, and may be formed in the shape of a rectangular box having a top and side surfaces and an open bottom surface, and may surround and accommodate the upper portion and the side portion of the outermost portion of the battery sub-packing unit 100.

Also, the side frame 220 of the battery module in an embodiment may include a supporting member 221 formed by bending at least a portion of the lower end, and the supporting member 221 may be disposed to support a portion of the lower portion of the battery sub-packing unit 100 disposed on the outermost portion among the plurality of battery sub-packing units 100.

That is, since the body frame unit 200 accommodates the battery sub-packing unit 100 such that the lower portion of the battery sub-packing unit 100 may be directly exposed to the outside, a component for supporting the battery sub-packing unit 100 may be necessary. To this end, the body frame unit 200 may include a supporting member 221 to partially support the lower portion of the battery sub-packing unit 100.

The body frame unit 200 may include a busbar 230, and an adhesive barrier 240 to accommodate and support the plurality of battery sub-packing units 100 in addition to the supporting member 221.

That is, the body frame unit 200 of the battery module in an embodiment may be disposed between the battery sub-packing unit 100 adjacent to each other or between the upper portion of the battery sub-packing unit 100 and the body frame unit 200 to prevent the spread of flames or heat transfer and may include a barrier 240 having an adhesive applied to an external surface thereof.

As described above, when heat and flames are generated in the battery cell 110 accommodated in the battery sub-packing unit 100 is discharged from the battery sub-packing unit 100, the barrier 240 may block the spread of heat and flames, and may also provide supporting power to allow battery sub-packing unit 100 to be accommodated in the body frame unit 200.

That is, to prevent spread of flames or heat transfer between the battery cells 110 provided in each of different battery sub-packing units 100, the barrier 240 may be disposed between the battery sub-packing units 100 adjacent to each other. To this end, a material of the barrier 240 may be a mica sheet, or the like.

The barrier 240 may include a first barrier 240a having an adhesive applied to the external surface to couple the battery sub-packing units 100 to each other, and disposed between the battery sub-packing units 100 adjacent to each other. Also, the barrier 240 may include a second barrier 240b having an adhesive applied to the external surface to couple the battery sub-packing unit 100 to the body frame unit 200 and disposed between the battery sub-packing unit 100 to the body frame unit 200. As such, the second barrier 240b may fix the battery sub-packing unit 100 to the body frame unit 200 by adhesive force, thereby preventing the battery sub-packing unit 100 from being separated from the body frame unit 200. Also, the first barrier 240a may integrally fix the plurality of battery sub-packing units 100 entirely by adhesive force, and the supporting member 221 may support the lower portion of the battery sub-packing unit 100 disposed on the outermost portion among the battery sub-packing unit 100, and accordingly, the battery sub packing unit 100 may be prevented from being separated from the body frame unit 200.

Also, the body frame unit 200 may support the plurality of battery sub-packing units 100 entirely by the busbar 230 coupled to the plurality of battery sub-packing units 100. A detailed description thereof will be described with reference to FIGS. 8 and 9.

Also, the body frame unit 200 may include an end frame 250, including front and rear end frames thereby covering the front and rear surfaces of the battery sub-packing unit 100, respectively. Also, a body vent hole 251 may be formed in the end frame 250 and may discharge flames and gas generated in the battery sub-packing unit 100 to the outside. A detailed description thereof will be described with reference to FIGS. 4 and 5.

Figure 4:
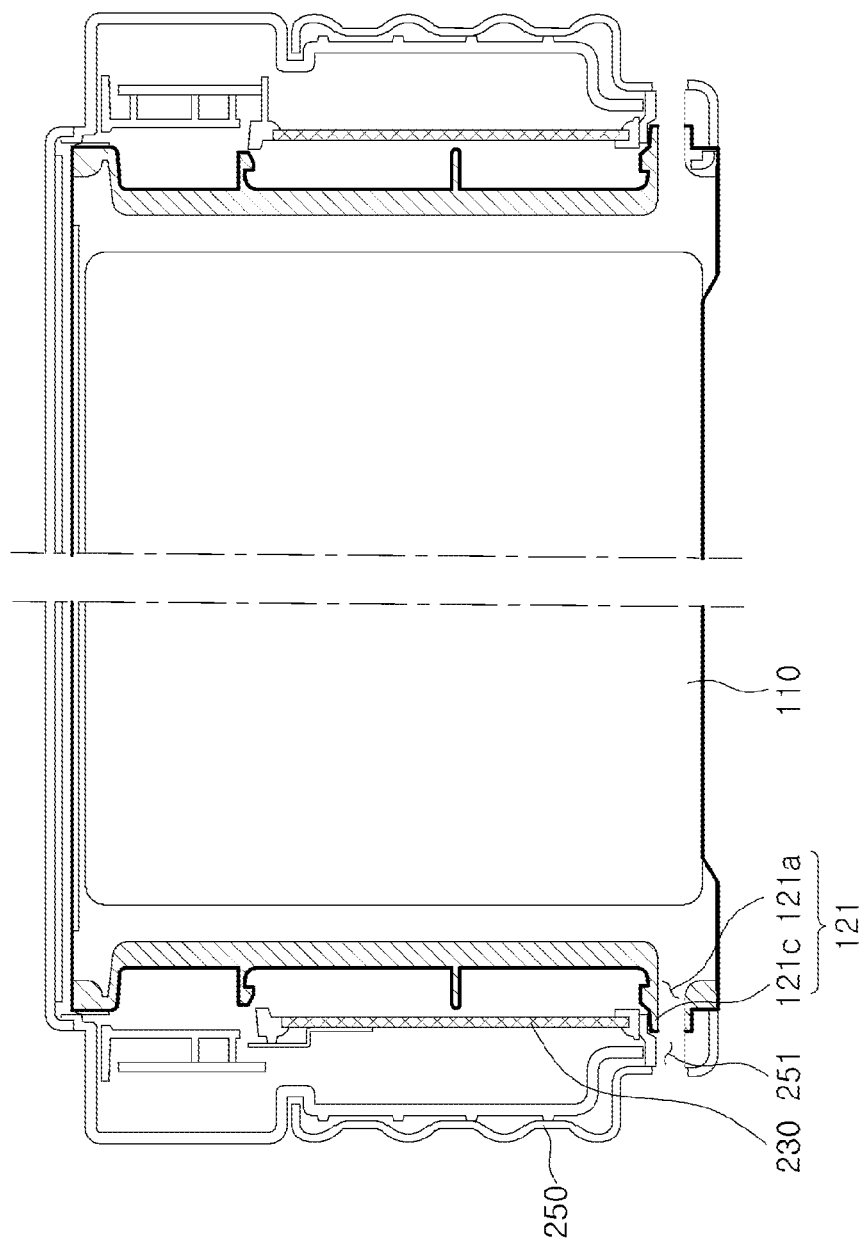
FIG. 4 is a cross-sectional diagram illustrating a battery module according to an embodiment of the present disclosure, viewed from the side.
Figure 5A:
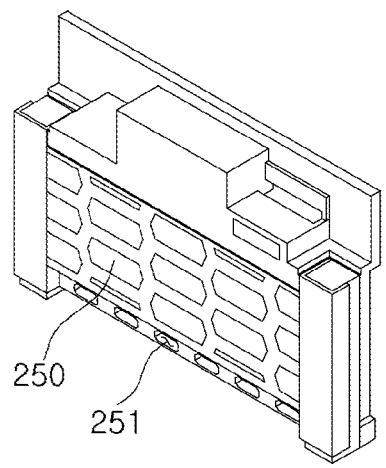
FIGS. 5A and 5B are a perspective diagram illustrating an end frame in a battery module according to an embodiment of the present disclosure.
Figure 5B:
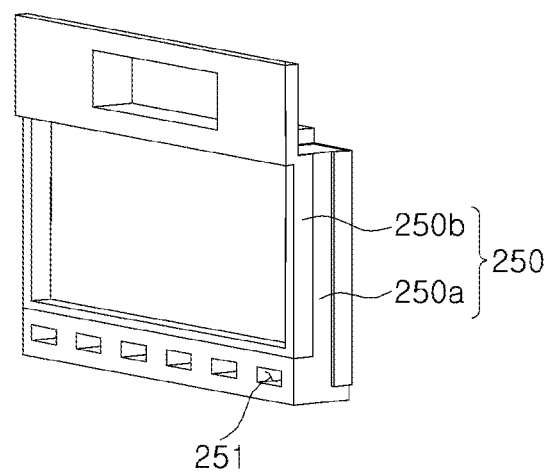

FIG. 4 is a cross-sectional diagram illustrating a battery module according to an embodiment. FIG. 5 is a perspective diagram illustrating an end frame 250 in a battery module according to an embodiment.

Referring to the drawings, the body frame unit 200 of the battery module in an embodiment may include an end frame 250 covering the front and rear surfaces of the plurality of battery sub-packing units 100. The end frame 250 may include the body vent hole 251 connected to the sub-vent hole 121*a* on a lower end.

That is, as the end frame 250 is configured to cover the front and rear surfaces of the battery sub-packing unit 100, the discharge path of flames and gas discharged through the sub-vent hole 121*a* formed in the front and rear surfaces of the battery sub-packing unit 100 may be prevented. Therefore, the body vent hole 251 may be formed to secure the discharge path of the flames and gas discharged from the battery sub-packing unit 100.

Also, since the body vent hole 251 is formed on the lower end of the end frame 250 to guide the flames to be discharged from the lower end of the body frame unit 200, when the battery module is mounted on an electric vehicle, the issue in which an occupant of the electric vehicle is affected by the ignition of the battery cell 110 may be reduced. That is, since the battery module is generally mounted on the bottom of the electric vehicle, an occupant of the electric vehicle may be disposed above the battery module. Therefore, when the flames are emitted from the lower end of the battery module, the occupant of the electric vehicle may be less affected thereby.

The end frame 250 may include a first end frame 250*a* and a second end frame 250*b*.

Figure 6:
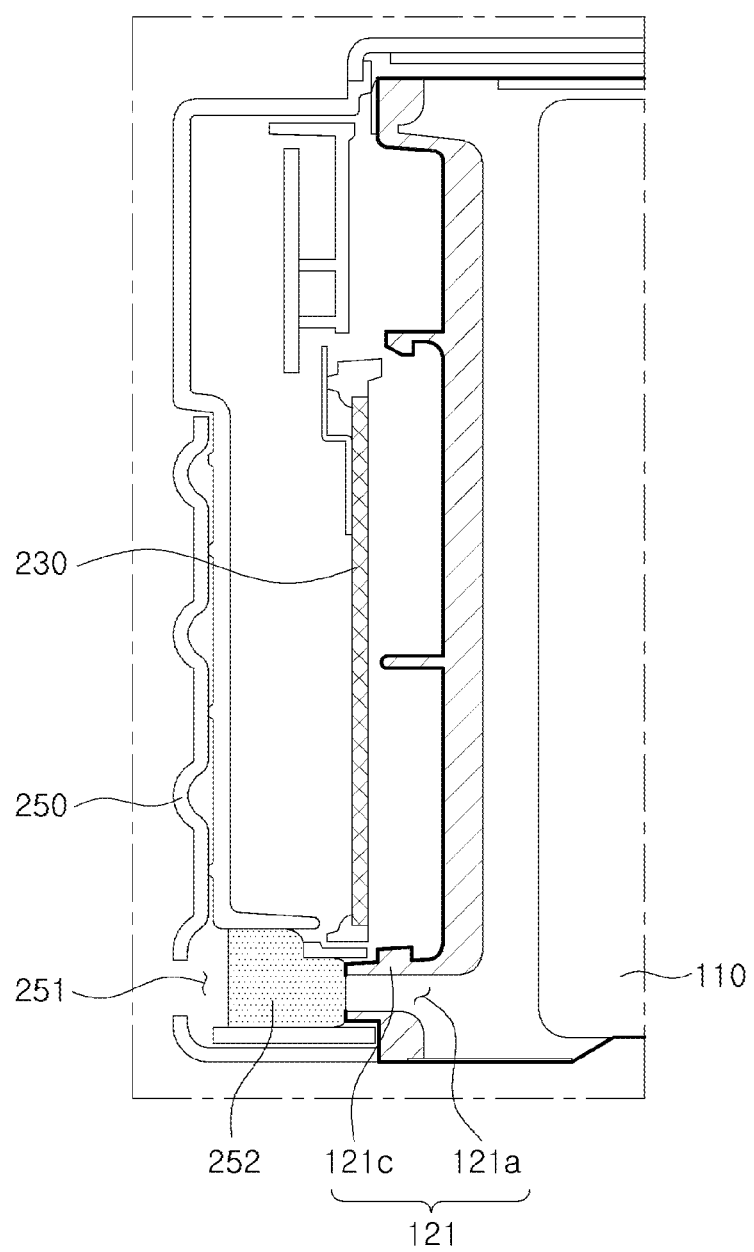
FIG. 6 is a cross-sectional diagram illustrating a battery module in which a metal foam block is provided on an end frame, viewed from the side.
Figure 7A:
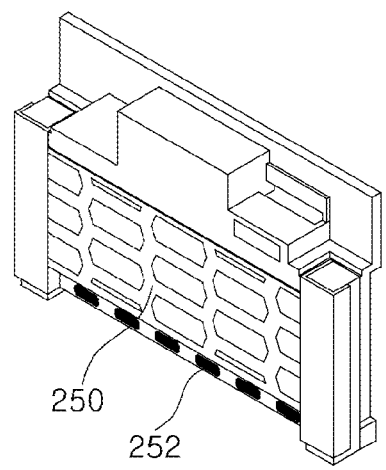
FIGS. 7A and 7B are a perspective diagram illustrating a battery module in which a metal foam block is provided on an end frame.
Figure 7B:
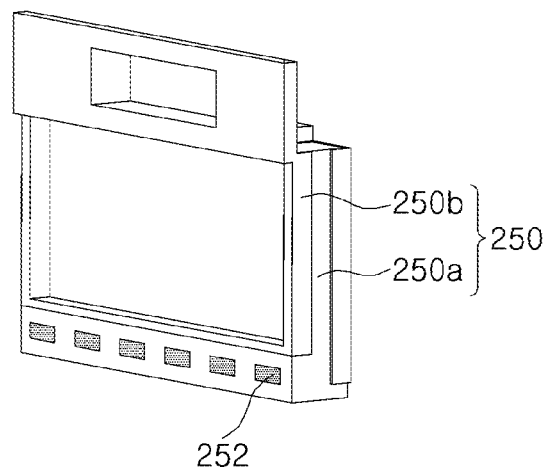

FIG. 6 is a cross-sectional diagram illustrating a battery module in which a metal foam block 252 is provided on an end frame 250, viewed from the side. FIG. 7 is a perspective diagram illustrating a battery module in which a metal foam block 252 is provided on an end frame 250.

Referring to the drawings, the end frame 250 of the battery module in an embodiment may be inserted to the body vent hole 251 to block the body vent hole 251, and may include a metal foam block 252 formed of a material melting by the flames generated in the battery sub-packing unit 100.

That is, when the body vent hole 251 is formed in the end frame 250, external foreign substances may enter the body frame unit 200 or the battery sub-packing unit 100. the metal foam block 252 may be disposed in the body vent hole 251.

Also, since the metal foam block 252 is formed of a material melting by the flames emitted from the battery sub-packing unit 100, the flames emitted from the battery sub-packing unit 100 may be discharged to the outside through the body vent hole 251.

Figure 8:
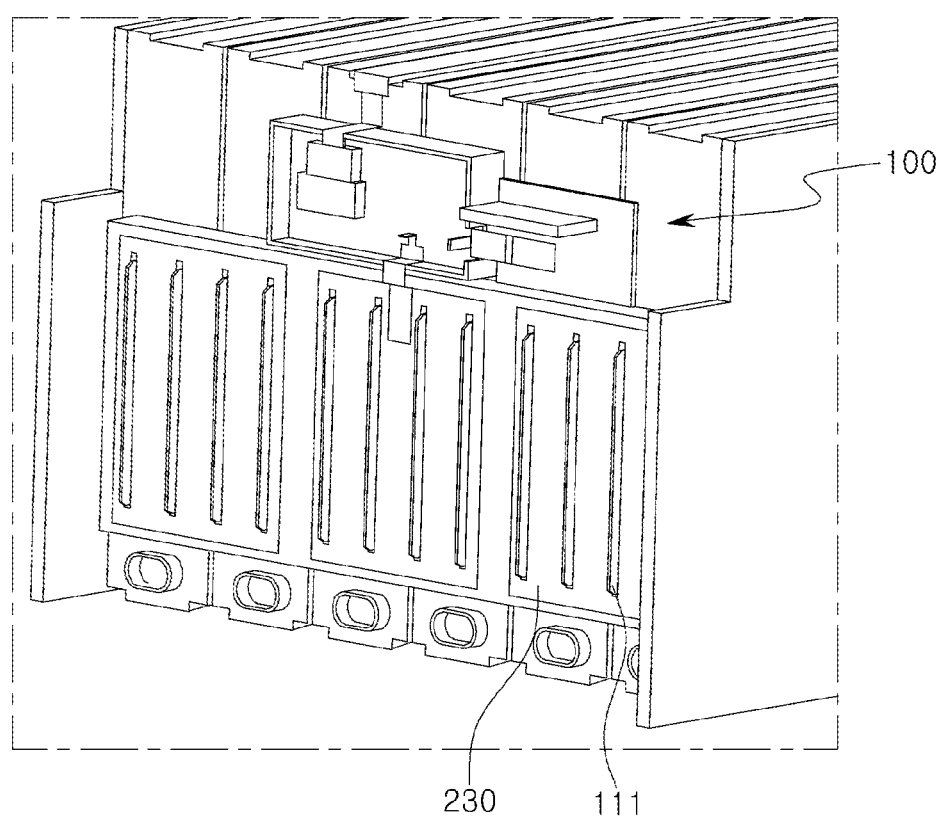
FIG. 8 is a perspective diagram illustrating a busbar portion in a battery module according to an embodiment of the present disclosure.
Figure 9:
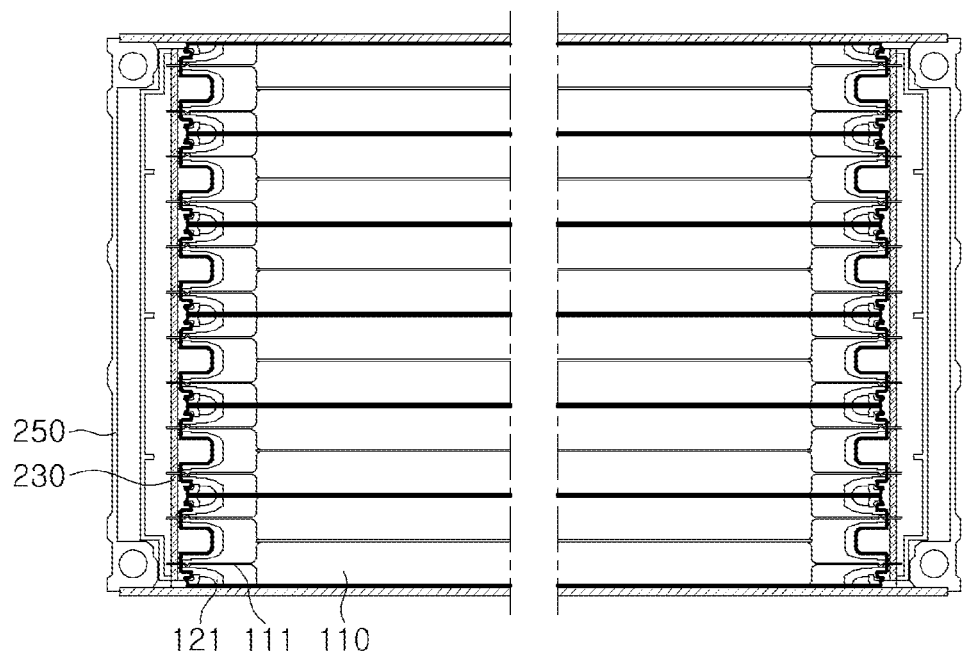
FIG. 9 is a perspective diagram illustrating a battery module according to an embodiment of the present disclosure.

FIG. 8 is a perspective diagram illustrating a busbar portion 230 in a battery module according to an embodiment. FIG. 9 is a cross-sectional diagram illustrating a battery module according to an embodiment.

Referring to the drawings, the body frame unit 200 of the battery module in an embodiment may include a busbar 230 to which the electrode tab 111 of the battery cell 110 accommodated in each of the plurality of battery sub-packing units 100 is coupled.

That is, the busbar 230 may be coupled to the plurality of battery sub-packing units 100 and may support the plurality of battery sub-packing units 100 entirely.

To this end, the busbar 230 may include a plurality of coupling holes to which the electrode tab 111 of the battery cell 110 is coupled. Accordingly, the plurality of battery sub-packing units 100 may be entirely coupled to the busbar 230 via the electrode tab 111.

As described above, the busbar 230 may integrally support the plurality of battery sub-packing units 100 entirely, and the lower portion of the battery sub-packing unit 100 disposed on the outermost portion among the plurality of battery sub-packing units 100 may be supported by the supporting member 221, the plurality of battery sub-packing units 100 may be entirely prevented from being separated from the body frame unit 200.

Figure 10A:
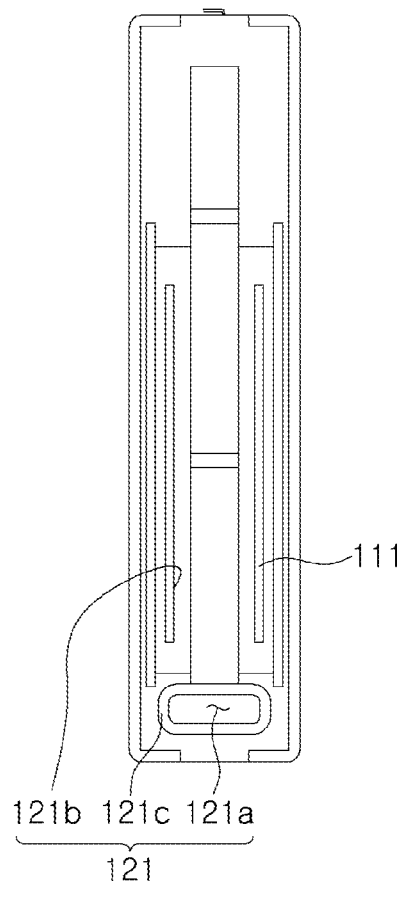
FIG. 10A and FIG. 10B show an enlarged diagram illustrating a portion of a battery module in which a sub-vent hole is formed according to an embodiment of the present disclosure.
Figure 10B:
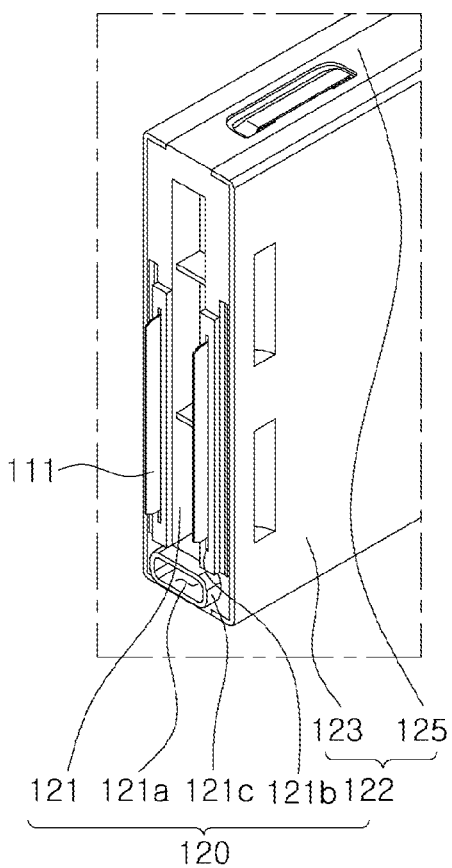
Figure 11:
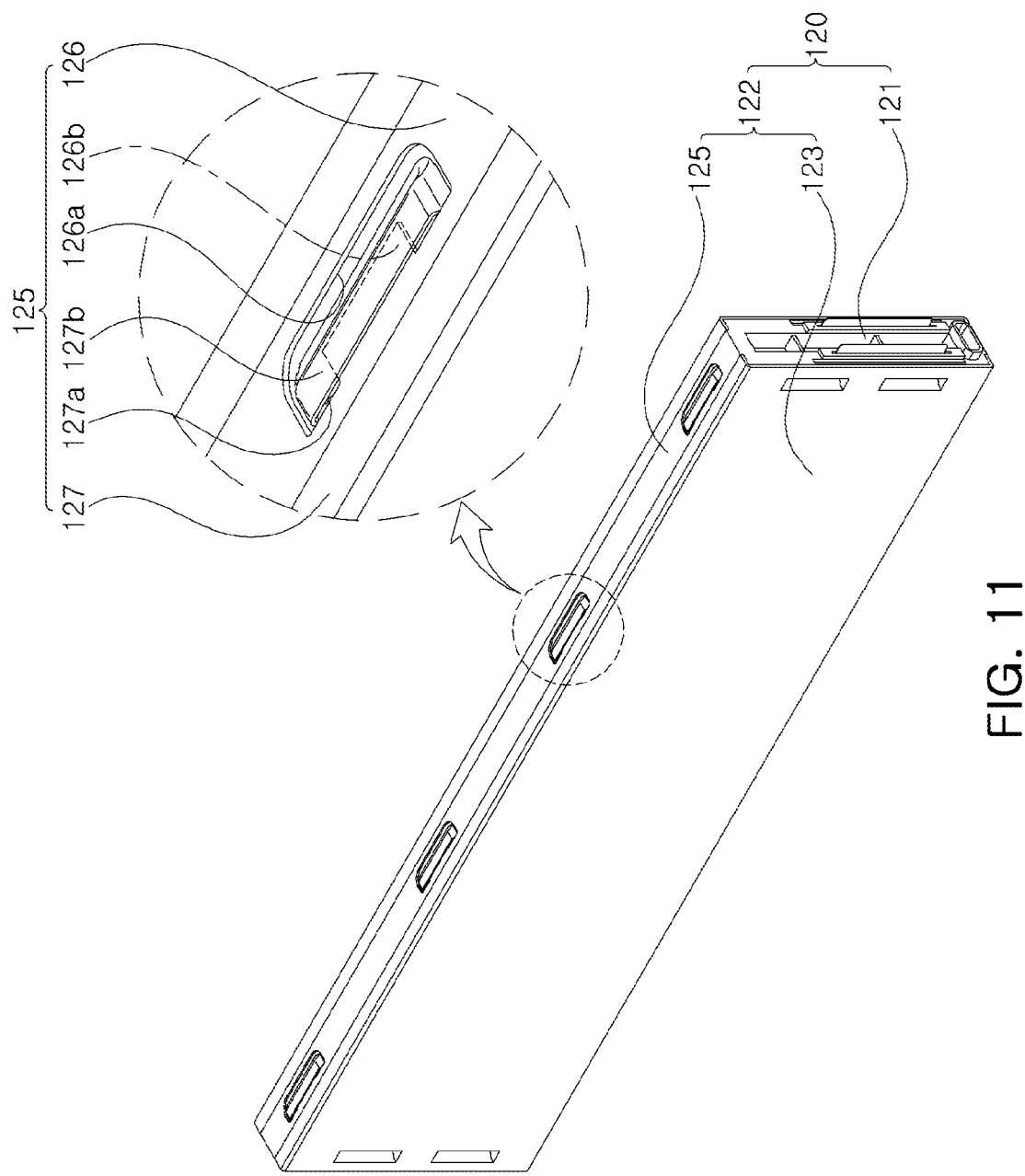
FIG. 11 is a perspective diagram illustrating a battery module in which a surrounding cover includes an accommodation can and an upper fastening portion according to an embodiment of the present disclosure.
Figure 12:
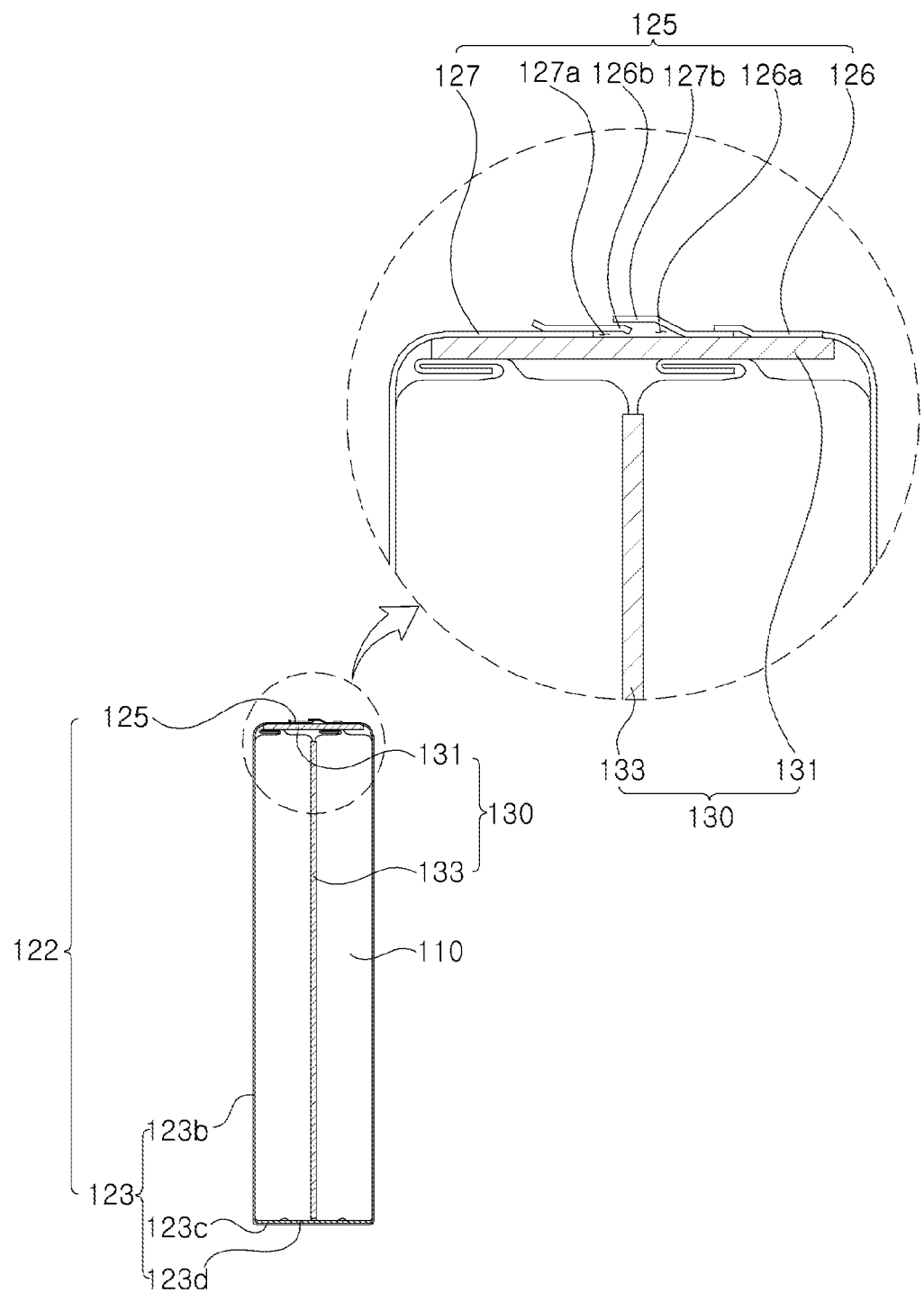
FIG. 12 is a cross-sectional diagram illustrating a battery module in which a surrounding cover includes an accommodation can and an upper fastening portion according to an embodiment of the present disclosure.
Figure 13:
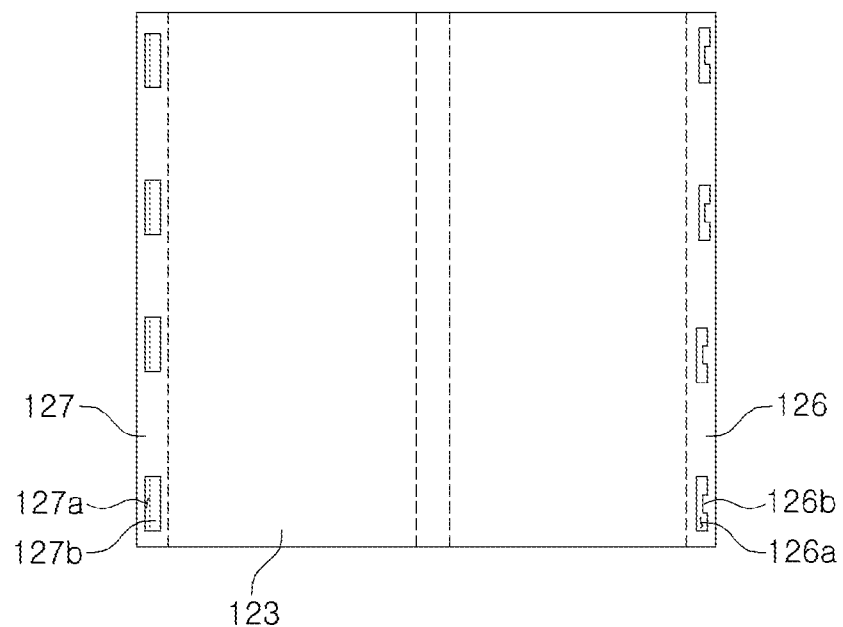
FIG. 13 is a diagram illustrating a state of a battery module in which a surrounding cover is unfolded.

FIG. 10A and FIG. 10B show an enlarged diagram illustrating a portion of a battery module in which a sub-vent hole 121*a* is formed according to an embodiment. FIG. 11 is a perspective diagram illustrating a battery module in which a surrounding cover 122 includes an accommodation can 123 and an upper fastening portion 125 according to an embodiment. FIG. 12 is a cross-sectional diagram illustrating a battery module in which a surrounding cover 122 includes an accommodation can 123 and an upper fastening portion 125 according to an embodiment. FIG. 13 is a diagram illustrating a state of a battery module in which a surrounding cover 122 is unfolded.

Referring to the drawings, the case 120 of the battery module in an embodiment may include an end panel 121 and a surrounding cover 122.

The end panel 121 may include front and rear end panels which are disposed respectively on the front and rear portions of the battery cell 110. Each end panel 121 is provided with slit holes 121*b* through which the electrode tabs 111 of the battery cells 110 pass. For example, in the embodiment shown in FIGS. 10A and 10B the front end panel 121 is provided with two slit holes 121*b* through each of which an electrode tab of a corresponding battery cell 110 is passing through to extend to the outside of the case 120. The same configuration may be employed for the rear end panel 121. The end panels may be fastened respectively to the front and rear end portions of the surrounding cover 122. The end panel 121 may include a sub-vent hole 121*a* connecting the external portion of the case 120 to the internal portion in which the battery cell 110 is disposed on a lower end. Also, the surrounding cover 122 may be provided such that the front and rear end panels 121 may be coupled to each of both front and rear ends of the surrounding cover 122, respectively. The surrounding cover 122 may surround portions of the battery cells 110 directed to the outside in a circumferential direction of the end panel 121.

That is, the case 120 may accommodate the battery cell 110 by the end panel 121 and the surrounding cover 122. Also, the case 120 may have the sub-vent hole 121*a* connecting the external portion to the internal portion in which the battery cell 110 is disposed on the lower end, and the other portion may be isolated from the outside.

Accordingly, the battery sub-packing unit 100 may guide flames from the lower end of the battery sub-packing unit 100 to be discharged to the outside when the battery cell 110 is ignited. Accordingly, the ignition of the battery cells 110 accommodated in one of the battery sub-packing units 100 may be prevented from being spread to the battery cells 110 accommodated in the other battery sub-packing unit 100 nearby.

That is, since the battery sub-packing unit 100 guides the path to discharge high-temperature, high-pressure flames and gas generated by the ignition of the battery cell 110 to the outside through the sub-vent hole 121*a*, the battery cell 110 accommodated in the other battery sub-packing unit 100 nearby may not be affected.

Also, since the battery sub-packing unit 100 may guide the flames to be discharged to the outside from the lower portion, when the battery sub-packing unit 100 is mounted on the electric vehicle, the occupant of the electric vehicle may be less affected by the ignition of the battery cell 110.

Also, the sub-vent hole 121*a* may be connected to the body vent hole 251, such that the flames and gas generated in the battery sub-packing unit 100 may be directly discharged to the outside.

The end panel 121 may accommodate the battery cell 110 to be isolated from the outside along with the surrounding cover 122, other than the portion in which the sub-vent hole 121a is formed. Accordingly, the flames and gas generated in the battery cell 110 may be guided to the sub-vent hole 121a.

Also, the end panel 121 may further include a sub-guide pipe 121c to enhance the effect of guiding the flames and gas discharged through the sub-vent hole 121a in a desired direction. That is, the end panel 121 of the battery module in an embodiment may include the sub-guide pipe 121c disposed around the sub-vent hole 121a, connected to the sub-vent hole 121a, and extending in an outward direction.

Also, the end panel 121 may be formed to include a plurality of materials. That is, an edge portion of the end panel 121 of the battery sub-packing unit 100 in an embodiment may be formed of the same metal material as that of the surrounding cover 122 and may be welded and coupled to the surrounding cover 122, and a central portion in which the slit hole 121b through which the electrode tab 111 penetrates may be formed of an insulating material.

For example, the edge portion of the end panel 121 may be formed of a stainless steel material in which the surrounding cover 122 is formed, and the central portion of the end panel 121 in which the slit hole 121b is formed may be formed of a plastic material.

The edge portion of the end panel 121 formed of a metal material and the central portion of the end panel 121 formed of a plastic material may be integrated with other by double injection, or may be attached to and coupled to each other.

As such, since the edge portion of the end panel 121 is formed of the same metal material as that of the surrounding cover 122, welding may be easily performed. Also, since the central portion of the end panel 121 is formed of an insulating material, an electrical influence on the electrode tab 111 may be reduced.

The surrounding cover 122 may be configured to isolate the battery cell 110 along with the end panel 121, and to this end, the surrounding cover 122 may surround the lower surface portion 110a, the side surface portion 110b, and the upper surface portion 110c of the battery cell 110 other than the front and rear portions.

A thickness and a material of the surrounding cover 122 may be limited to prevent melting by flames and to secure fire resistance. For example, the case 120 may be formed of a metal material in a thickness of about 0.2 mm to about 0.5 mm.

Specifically, the surrounding cover 122 of the battery module in an embodiment may be formed of a stainless steel material, or a metal material having a melting point of at least 1000° C. or higher.

When the surrounding cover 122 is formed of a stainless steel material, formability may be low, and it may be difficult to maintain the shape by spring back after press molding and bending molding, and accordingly, the surrounding cover 122 may include an accommodation can 123 and an upper fastening portion 125. Accordingly, the surrounding cover 122 may address the issue caused by spring back occurring after molding the surrounding cover 122 and may enhance coupling.

When the material of the surrounding cover 122 is formed of a metal material having a melting point of at least 1000° C. or higher, even when flames occur in the battery cell 110, the battery cell 110 may not melt and may maintain the shape thereof. Accordingly, flames and gas generated in the case 120 may be guided to the sub-vent hole 121a.

Also, the surrounding cover 122 of the battery module in an embodiment may be formed of the same metal material as that of the body frame unit 200. Accordingly, galvanic corrosion which may occur between the body frame unit 200 and the surrounding cover 122 may be prevented. That is, galvanic corrosion in which corrosion of a material on one side is accelerated according to a difference in ionization tendency may be prevented.

Specifically, the surrounding cover 122 of the battery module in an embodiment may include an accommodation can 123 and an upper fastening portion 125.

The accommodation can 123 may be provided such that the end panel 121 may be coupled to each of both ends thereof, and the accommodation can 123 may surround the lower surface portion 110a and the side surface portion 110b of the battery cell 110 directed in an outward direction. A pair of the upper fastening portions 125 may be provided such that the upper fastening portions 125 extend from the side wall portions 123b of the accommodation cans 123 opposing each other, may be bent in the direction of the upper surface portion 110c of the battery cell 110, and may be fastened to each other to surround the upper surface portion 110c of the battery cell 110.

As such, when a single battery cell 110 is accommodated, the accommodation can 123 may have a "⊏" shape surrounding lower surface portion 110a and both side surface portions 110b of the battery cell 110. Also, when a pair of battery cells 110 are provided, the accommodation can 123 may have a "⊏" shape surrounding a side surface portion 110b of one of the pair of battery cells 110 and an opposite side surface portion 110b of the other battery cell 110 and surrounding a lower surface portion 110a of the pair of battery cells 110. Also, when three or more battery cells 110 are provided, the accommodation can 123 may have a "⊏" shape surrounding a side surface portion 110b of the battery cell 110 disposed on an outermost portion among the three or more battery cells 110 and a lower surface portion 110a of the three or more battery cells 110.

Also, the lower surface portion 110a of the battery cell 110 may be seated on a lower wall portion 123c of the accommodation can 123, and a thermally conductive member 123d may be provided between the lower wall portion 123c of the accommodation can 123 and the lower surface portion 110a of the battery cell 110.

The upper fastening portion 125 may be integrated with both ends of the accommodation can 123.

The upper fastening portion 125 may be configured to extend from a pair of side wall portions 123b of the accommodation can 123 and may be coupled to each other to surround the upper surface portion 110c of the battery cell 110.

Specifically, the upper fastening portion 125 of the battery module in an embodiment may include a first fastening portion 126 and a second fastening portion 127.

The first fastening portion 126 may extend from a side wall portion 123b on one side of the accommodation can 123, a hooking groove 126a may be formed therein, and a hook 126b protruding into the hooking groove 126a may be provided. The second fastening portion 127 may extend from the side wall portion 123b of the other side of the accommodation can 123, and an accommodation groove 127a into which the hook 126b is inserted may be formed.

That is, each of the first fastening portion 126 and the second fastening portion 127 may be bent in the direction of the upper surface portion 110c of the battery cell 110, and the hook 126b may be coupled to and hooked by the accommodation groove 127a, such that the first fastening portion 126 and the second fastening portion 127 may be fastened to each other.

The direction in which the hook 126b protrudes may be the direction of one end of the first fastening portion 126, which is a boundary portion in which the first fastening portion 126 is integrated with and connected to the accommodation can 123, and accordingly, even when the accommodation can 123 is forced to be separated outwardly by spring back, the coupling between the first fastening portion 126 and the second fastening portion 127 may be enhanced.

Also, the second fastening portion 127 may have a stepped portion 127b such that, when the hook 126b is inserted into the accommodation groove 127a, a height difference may not be formed between the first fastening portion 126 and the second fastening portion 127. That is, the stepped portion 127b may shift upwardly the space in which the hook 126b is disposed and inserted into the accommodation groove 127a by as much as the thickness of the hook 126b.

As an example, the accommodation can 123 and the upper fastening portion 125 may be coupled to each other while the battery cell 110 is accommodated by the method described below.

In a first stage, battery cell 110 may be seated on a blank material in the form of a plate, both ends of the blank material may be bent in the direction of the side surface portion 110b of the battery cell 110, the accommodation can may be formed in the form of a "⊏," and the battery cell 110 may be enclosed. In a second stage, the end panel 121 may be disposed on each of both ends of the accommodation can 123, and the accommodation can 123 and the end panel 121 may be coupled by welding. In a third stage, the first fastening portion 126 and the second fastening portion 127 extending upwardly from both side wall portions 123b of the accommodation can 123 may be bent in the direction of the upper surface portion 110c of the battery cell 110, and in this case, the hook 126b may be coupled and fastened to the accommodation groove 127a.

The first stage may be performed such that, after the accommodation can 123 is formed in a "⊏" shape in advance, the battery cell 110 may slide into both ends of the accommodation can 123.

Also, the battery module may further include an inner pad 130 in an embodiment.

The inner pad 130 may be disposed in the case 120, may be in contact with the at least one battery cell 110 accommodated in the case 120, and may generate at least one of carbon dioxide and nitrogen during oxidation, thereby blocking the inflow of external oxygen.

That is, as the inner pad 130 is oxidized by the flames generated in the battery cell 110 in the case 120, at least one of carbon dioxide and nitrogen may be generated, and the created carbon dioxide and nitrogen may be filled in the case 120, such that external oxygen may be prevented from flowing into the case 120. Accordingly, oxidation may no longer occur in the case 120 and the flames may be extinguished.

In some embodiments, the inner pad 130 may be in contact with all the battery cells. Since the inner pad 130 is in contact with all battery cells 110, even when flames occurs in one of the plurality of battery cells 110, the inner pad 130 may be immediately oxidized such that at least one of carbon dioxide and nitrogen may be generated. Accordingly, flames may be extinguished rapidly.

The inner pad 130 of the battery module in an embodiment may be formed of a melamine material.

Since a melamine material has a relatively large rate of nitrogen generation during oxidation as compared to other materials, a melamine material may be effective for extinguishment.

The inner pad 130 may be disposed in at least one region between the side surface of the battery cell 110 and the internal surface of the case 120 and between the upper surface of the battery cell 110 and the internal surface of the case 120. That is, in order for the inner pad 130 to be in contact with the entire battery cells 110, the inner pad 130 may include a side pad portion disposed between the side surface of the battery cell 110 and the internal surface of the case 120 and an upper pad portion 131 disposed between the upper surface of the battery cell 110 and the internal surface of the case 120. In this case, the inner pad 130 may protect the battery cell 110 from external impact or may buffer swelling of the battery cell 110.

Also, when a plurality of the battery cells 110 are provided, the inner pad 130 may be disposed between the battery cells 110 adjacent to each other. That is, the inner pad 130 may include a center pad portion 133 disposed between the battery cells 110 adjacent to each other, and in this case, the inner pad 130 may block heat transfer between the battery cells 110 adjacent to each other.

According to the aforementioned embodiment, the battery module may prevent spread of ignition of the battery cell.

Also, the battery module may prevent lowering cooling efficiency of the battery cell.

Further, the battery module may guide flames to the outside or may extinguish the flames when the battery cell ignites.

When the battery module is installed in an electric vehicle, impact on the occupant of the electric vehicle caused by flames may be reduced when the battery cell ignites.

While the embodiments have been illustrated and described above, it will be apparent to those skilled in the art that modifications and variations could be made without departing from the scope of the present disclosure as defined by the appended claims.

What is claimed is:

1. A battery module, comprising:
a plurality of battery sub-packing units stacking in a first direction and including at least one battery cell and a case in which the at least one battery cell is accommodated; and
a body frame unit comprising an upper frame surrounding upper surfaces, and side frames surrounding outermost side surfaces of the plurality of battery sub-packing units along the first direction, exposing at least a portion of lower surfaces of the plurality of battery sub-packing units to the outside,
wherein the side frames face each other in the first direction,
wherein each of the side frames includes a supporting member at a lower end thereof and bent at an angle, the supporting members are positioned to oppose the upper frame and to support a lower portion of a battery sub-packing units disposed on an outermost portion among the plurality of the battery sub-packing units, the supporting members do not support any battery sub-packing unit not disposed on the outermost portion,
wherein the supporting members are not connected to each other along the lower portion of the battery sub-packing units.

2. The battery module of claim 1, wherein the body frame unit includes:

an upper frame covering the upper surfaces of the plurality of battery sub-packing units; and side frames extending from both ends of the upper frame, respectively, and bent to oppose each other so as to surround the outermost side surfaces of the plurality of battery sub-packing units.

3. The battery module of claim 1, wherein the body frame unit includes a busbar to which an electrode tab of the battery cell accommodated in each of the plurality of battery sub-packing units is connected.

4. The battery module of claim 1, wherein the body frame unit includes a barrier disposed between the battery sub-packing units adjacent to each other or between an upper portion of the battery sub-packing unit and the body frame unit, preventing flame transfer or heat transfer, and having an external surface applied with an adhesive.

5. The battery module of claim 1,
wherein the case includes:
front and rear end panels disposed on front and rear portions of the at least one battery cell, and configured to include a sub-vent hole formed in a lower end portion thereof for communicating with an exterior of the case and an interior of the case; and
a surrounding cover configured to surround at least a portion of an outer surface of the at least one battery cell along an edge of the front and rear end panels.

6. The battery module of claim 5, wherein at least one of the front and rear end panels include a sub-guide pipe disposed on a periphery of the sub-vent hole, configured to communicate with the sub-vent hole, and having a shape extending outwardly.

7. The battery module of claim 5, wherein the surrounding cover is made of the same metal material as the body frame unit.

8. The battery module of claim 7, wherein the surrounding cover includes stainless steel or a metal having a melting point of 1000° C. or higher.

9. The battery module of claim 5, wherein the surrounding cover includes:
an accommodation can having front and rear end portions to which the front and rear end panels are respectively coupled, and surrounding a lower surface portion and a side surface portion of the at least one battery cell directed in an outward direction; and
a pair of upper fastening portions extending from side wall portions of the accommodation can opposing each other, bent in a direction of the upper surface portion of the battery cell, and fastened to each other to surround the upper surface portion of the battery cell.

10. The battery module of claim 9, wherein the pair of the upper fastening portions includes:
a first fastening portion extending from the side wall portion of one side of the accommodation can, having a hooking groove formed therein, and having a hook protruding inwardly of the hooking groove; and
a second fastening portion extending from the side wall portion of the other side of the accommodation can and having an accommodation groove into which the hook is inserted.

11. The battery module of claim 1, wherein the battery sub-packing unit includes an inner pad disposed in the case, the inner pad being in contact with at least a portion of the at least one battery cell accommodated in the case and configured to block an inflow of external oxygen by generating at least one of carbon dioxide and nitrogen during oxidation.

12. The battery module of claim 11, wherein the inner pad includes a melamine material.

13. The battery module of claim 5,
wherein the body frame unit includes front and rear end frames covering front and rear surfaces of the plurality of battery sub-packing units, respectively, and
wherein at least one of the front and rear end frames include a body vent hole communicating with the sub-vent hole in a lower end portion thereof.

14. The battery module of claim 13, wherein the front and rear end frames include a metal foam block inserted into the body vent hole to block the body vent hole and formed of a material meltable by heat of flames generated in the battery sub-packing unit.

15. A battery module, comprising:
a plurality of battery sub-packing units stacking in a first direction, each of the plurality of battery sub-packing unit including at least two battery cells accommodated within a case and separated from each other with an inner pad; and
a body frame unit completely covering upper surfaces and side surfaces of the plurality of the battery sub-packing units along the first direction, exposing at least a portion of lower surfaces of the plurality of battery sub-packing units to the outside,
wherein the outermost side surfaces of the body frame unit oppose each other in the first direction to contain the plurality of battery sub-packing units therebetween,
wherein each of the outermost side surfaces of the body frame unit includes a supporting member at a lower end thereof and bent at an angle, the supporting members are positioned to oppose the upper frame and to support a lower portion of a battery sub-packing units disposed on an outermost portion among the plurality of the battery sub-packing units, the supporting members do not support any battery sub-packing unit not disposed on the outermost portion,
wherein the supporting members are not connected to each other along the lower portion of the battery sub-packing units.

* * * * *